United States Patent [19]

Serre et al.

[11] 3,887,705

[45] June 3, 1975

[54] MEDICAMENTS INTENDED FOR THE PREVENTION AND TREATMENT OF CAPILLARY-VENOUS DEFICIENCIES

[75] Inventors: Hubert Serre, Mazamet; Jean Rey, Castres, both of France

[73] Assignee: Pierre Fabre S.A., Paris, France

[22] Filed: May 17, 1973

[21] Appl. No.: 361,020

[30] Foreign Application Priority Data
May 17, 1972 France.............................. 72.17754

[52] U.S. Cl. ................. 424/180; 424/261; 424/280
[51] Int. Cl.² ........................................ A61K 27/00
[58] Field of Search..................... 424/261, 280, 180

[56] References Cited
OTHER PUBLICATIONS

Fein–Modern Drug Encyclopedia–eighth edition–(1961) pages.

Aellig–Chem. Abst., Vol. 68, (1968), page 94527 f.

Mellander et al., Chem. Abst., Vol. 73(1970), page 129470 q.

Primary Examiner—Sam Rosen
Attorney, Agent, or Firm—Gordon W. Hueschen

[57] ABSTRACT

The present invention relates to new compositions which are useful as medicaments. These new compositions contain dihydroergotamine, one or more vitamin P factors and a vitamin C factor.

They are useful in the prevention and treatment of disturbances of the vein wall, particularly the orthostatic syndrome.

12 Claims, No Drawings

MEDICAMENTS INTENDED FOR THE PREVENTION AND TREATMENT OF CAPILLARY-VENOUS DEFICIENCIES

The present invention, discovered at the Pierre Fabre Research Center concerns new medicaments formed by the combination of a hydrogen derivative of an ergot alkaloid, dihydroergotamine and its salts, with one or more vitamin P factors and/or a vitamin C factor (ascorbic acid and derivatives).

These new medicaments are useful in the prevention and treatment of circulatory disturbances, particularly in diseases of the vein wall in which blood statis is the main symptom (varices, edemas, hemorrhoids), in the orthostatic syndrome, in the case of hypotension induced by prolonged treatments with neuroleptics, and in the treatment of migraine. They may be administered orally or parenterally.

It is known that in doses which have no action on the arterial musculature, dihydroergotamine has the property of acting selectively on the smooth muscular fiber of the vein wall. Moreover, it is known that vitamin P factors exert an action on the capillary permeability by opposing the leakage of plasma from the capillaries in declivous regions, which leakage is equivalent, from the standpoint of general hemodynamics, to an easily demonstrable despoliation. Furthermore, it has been proven that there was competition between the P factors and the catechol-orthomethyl transferase which normally catabolizes the catecholamines.

The combination of the dihydroergotamine and vitamin P factors makes it possible to assure simultaneously a tonic action and a prolonged vasoconstrictive action at the level of the veins. The synergism which takes place between the activity of the two active principles leads to a clearly superior phlebotonic action. This action may be reinforced by furthermore adding vitamin C. It is known, as a matter of fact, that this vitamin potentiates the action of the P factors and stimulates the adrenals, which is particularly useful in the orthostatic syndrome. Furthermore, there is a relationship between the vitamin C content of the adrenal cortex and the possibilities of responding to stress. Now dihydroergotamine results in a decrease in the quantity of ascorbic acid in the adrenal glands. This discrease in ascorbemia and the depletion of the adrenals in ascorbic acid has therefore led the applicant to supplement the dihydroergotamine/P factors association by vitamin C or various ascorbates.

Pharmacological study has made it possible to show the definite potentiation of the combination as compared with each component by itself, which study is effected in particular by means of a test developed by us which consists in measuring the edema of a mouse's tail subjected to a centrifuging of controlled intensity and duration, thus recreating, so to say, the conditions for the appearance of an orthostatic syndrome.

After having assured ourselves of the complete tolerance of these products on animals, clinical tests were carried out.

The combinations were administered to 8 groups (4 control groups treated with placebos which contained only dihydroergotamine) of 30 patients suffering from orthostatic syndrome (generally of venous origin), to whom the well known Schellong test was applied; the pressure "pinching" shown prior to treatment is replaced by a normalizing of the arterial pressure and the disappearance of the pinching of the pulse pressure and the reflex tachycardia.

In the case of one group of patients exhibiting orthostatic cerebral hypotension after prolonged confinement to bed (medical and surgical convalescence), shown by the Schellong test, the following results were obtained (treatment of an average duration of two weeks).

|  | Schellong + | Schellong − | Total |
|---|---|---|---|
| Not treated | 6 | 2 | 8 |
| Treated (with combination) | 4 | 18 | 22 |
| Total | 10 | 20 | 30 |

A few examples of formulas which were the object of the aforementioned clinical tests are given by way of illustration below.

EXAMPLE I

Tablets according to formula
Dihydroergotamine methane sulfonate — 2 mg
Trihydroxy ethyl rutin — 150 mg
Ascorbic acid — 350 mg
Excipient q.s. for 1 tablet

EXAMPLE II

Dragees according to formula
Dihydroergotamine methane sulfonate — 2 mg
Hesperidine methyl chalcone — 150 mg
Magnesium ascorbate — 350 mg
Excipient q.s. for 1 dragee

EXAMPLE III

Delayed-action tablets according to formula
Dihydroergotamine — 4 mg
Trihydroxy ethyl rutin — 200 mg
Ascorbic acid — 100 mg
Excipient q.s. for 1 delayed-action tablet

EXAMPLE IV

Drinkable liquor (drops) according to formula
Dihydroergotamine methane sulfonate — 200 mg
Sodium ascorbate — 3 g
Hesperidine methyl chalcone — 1 g
Sodium metabisulfite q.s. for — 0.1 g of $SO_2$
Excipient q.s. for — 100 ml

EXAMPLE V

Dihydroergotamine methane sulfonate — 2 mg
Vitamin C — 350 mg
Hesperidine methyl chalcone — 130 mg
Methyl - 4 esculetol monoethanoate — 20 mg
Excipient q.s. for 1 tablet From the foregoing Examples, it is clear that the components of the compositions of the present invention can be employed in effective amounts in the proportions by weight as follows: about two parts of a) dihydroergotamine or a pharmaceutically acceptable salt thereof, to 10-150 parts of b) at least one vitamin P compound, and 30-350 parts of c) ascorbic acid (vitamin C) in a form useful in medicaments, it being noted that the foregoing Example IV provides a proportion of a to b to c which is 2/10/30.

We claim:

1. Pharmaceutical composition useful in the prevention and treatment of circulatory disturbances comprising in effective amounts
   a. dihydroergotamine or a pharmaceutically acceptable salt thereof,
   b. at least one vitamin P compound, and
   c. ascorbic acid (vitamin C) in a form useful in medicaments, wherein said components (a), (b) and (c) are present in amounts so as to provide the components in a proportion by weight of about 2 parts of (a), 10-150 parts of (b), and 30-350 parts of (c).

2. Pharmaceutical composition in accord with claim 1 in a delayed-action pharmaceutical form.

3. Pharmaceutical composition in accord with claim 1 wherein said components are present in amounts so as to provide the components in a proportion of about 2 milligrams of (a) to about 150 milligrams of (b) and about 350 milligrams of (c).

4. Pharmaceutical composition in accord with claim 1 wherein the vitamin P compound is selected from the group consisting of trihydroxy ethyl rutin, hesperidine methyl chalcone, and methyl-4-esculetol monoethanolate.

5. Composition in accord with claim 4 comprising (a) dihydroergotamine methane sulfonate, (b) trihydroxy ethyl rutin, and (c) ascorbic acid.

6. Composition in accord with claim 4 comprising (a) dihydroergotamine methane sulfonate, (b) hesperidin methyl chalcone, and (c) magnesium ascorbate.

7. Composition in accordance with claim 4 comprising (a) dihydroergotamine methane sulfonate, (b) hesperidin methyl chalcone, and (c) sodium ascorbate.

8. Composition in accordance with claim 4 comprising (a) dihydroergotamine methane sulfonate, (b) hesperidin methyl chalcone, and methyl-4-esculetol monoethanolate, and (c) ascorbic acid.

9. Composition in accordance with claim 8 comprising the ingredients (a), (b) and (c) thereof in a proportion of (a) about 2 milligrams of dihydroergotamine, (b) about 130 milligrams of hesperidin methyl chalcone, about 20 milligrams of methyl-4-esculetol monoethanolate and (c) about 350 milligrams of vitamin C.

10. A method for the prevention and treatment of circulatory disturbances of the vein wall and the orthostatic syndrome which comprises administering to a patient subject to such circulatory disturbance an amount of the composition of claim 1 effective for alleviation of such condition.

11. A method for the prevention and treatment of circulatory disturbances which comprises administering to a patient suffering from such circulatory disturbance an amount of the composition of claim 3 effective for alleviation of such condition.

12. A method for the prevention and treatment of circulatory disturbances of the vein wall and the orthostatic syndrome which comprises administering to a patient subject to such circulatory disturbance an amount of the composition of claim 9 effective for alleviation of such condition.

* * * * *